March 6, 1945. W. M. BLAGDEN 2,371,022
STEERING MECHANISM FOR MOTOR VEHICLES
Filed Nov. 16, 1942 5 Sheets-Sheet 4
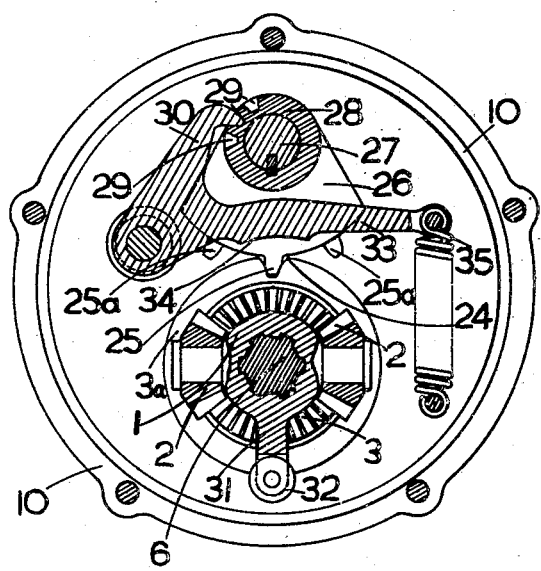
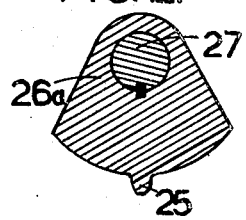 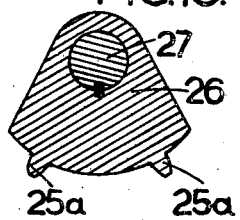
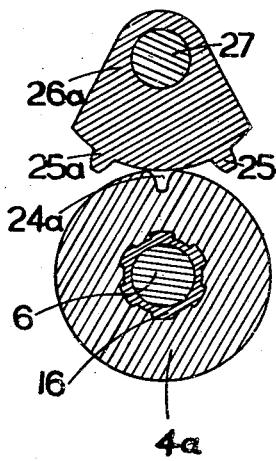 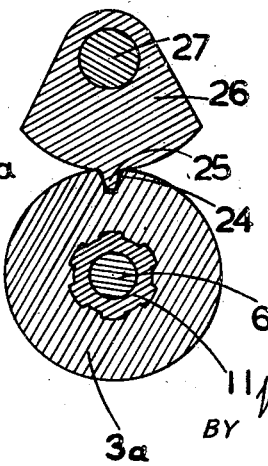
INVENTOR
William Martin Blagden
BY
ATTORNEYS March 6, 1945.  W. M. BLAGDEN  2,371,022

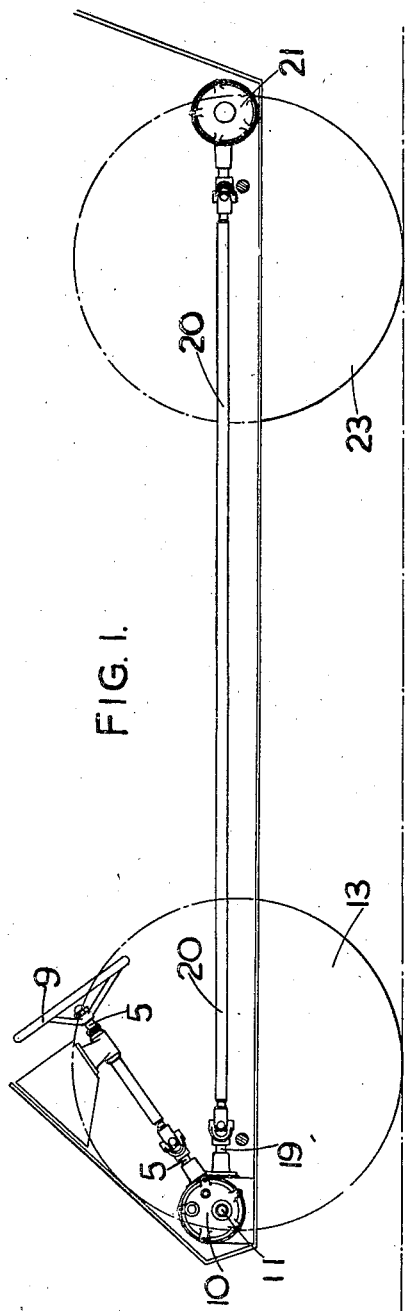

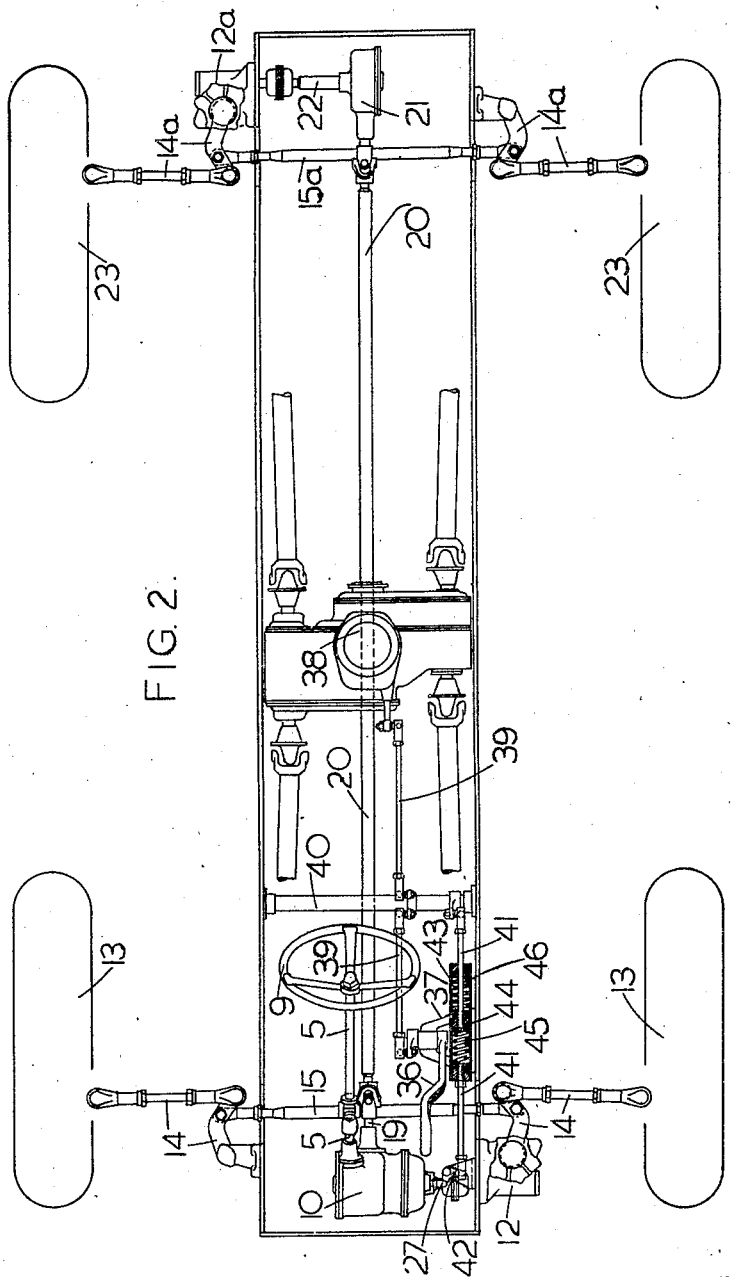

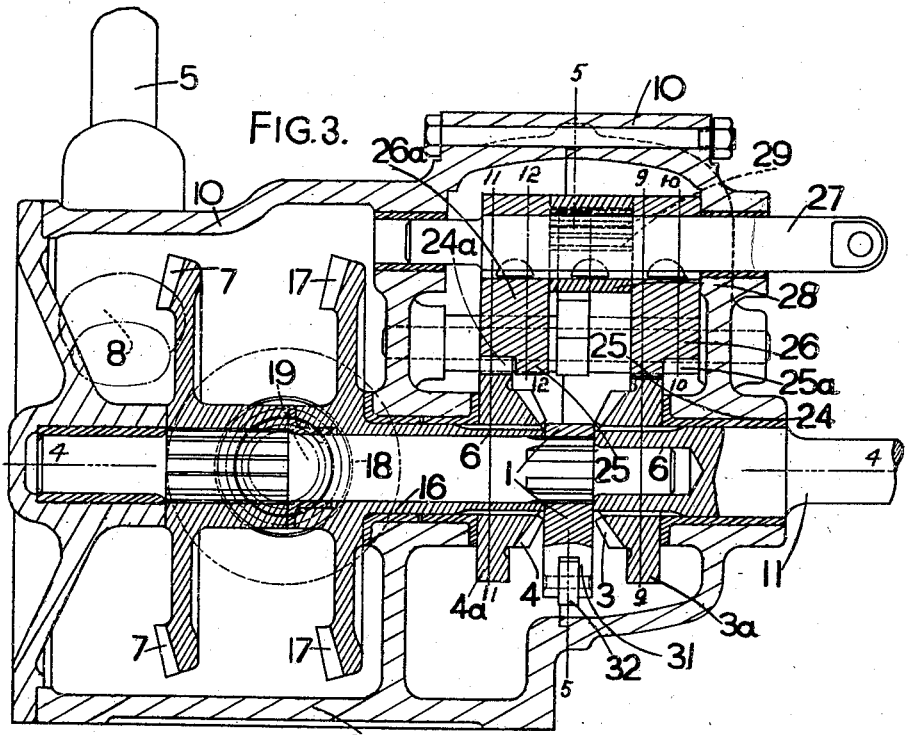
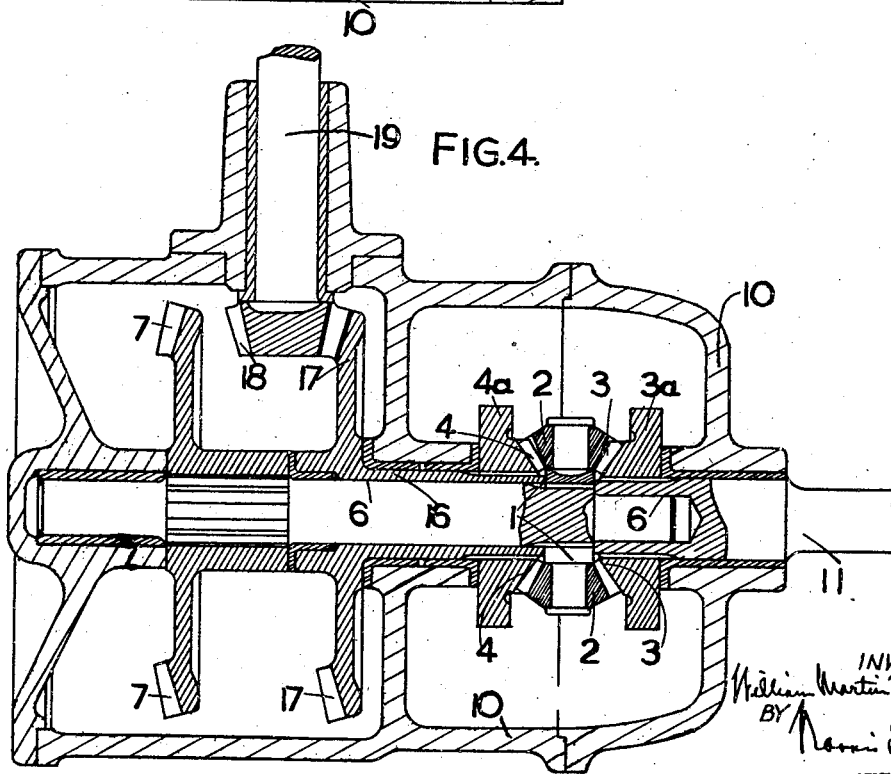

STEERING MECHANISM FOR MOTOR VEHICLES

Filed Nov. 16, 1942  5 Sheets-Sheet 5

INVENTOR
William Martin Blagden
BY
ATTORNEYS

Patented Mar. 6, 1945

2,371,022

UNITED STATES PATENT OFFICE 2,371,022

STEERING MECHANISM FOR MOTOR VEHICLES

William Martin Blagden, Egham, England

Application November 16, 1942, Serial No. 465,762
In Great Britain June 5, 1941

7 Claims. (Cl. 180—50)

This invention relates to steering mechanism for motor vehicles operative on all four wheels, and has for its object to provide improved means for facilitating the steering of such vehicles when travelling in either direction, wherein the operation of the steering wheel or like device, when the vehicle is travelling in a forward direction, will first steer the front road wheels, and upon their reaching the position of full or maximum lock, further turning movement of the steering wheel in the same direction will then steer the rear road wheels onto full lock whereby the diameter of the circle is reduced within which the vehicle may be turned, and wherein means are also provided which are adapted to be operated by the actuating mechanism of the reverse gearing to cause the front road wheels to be locked, and the rear road wheels to be placed under the control of the steering wheel, so that turning movement of the steering wheel will first steer the rear road wheels to full or maximum lock when a further turning movement of the steering wheel in the same direction will then steer the front wheels onto full or maximum lock.

The present invention is characterized by the provision and use of a differential or rotary mechanism incorporated in the steering mechanism and coupled to the rotating shaft driven by the steering wheel, and also adapted to be coupled to the rotating shafts driving the front and rear road wheel steering gears respectively to effect the progressive steering of the front and rear road wheels, or the rear and front road wheels, according to the direction in which the vehicle is geared to travel.

The invention also consists in means for controlling or locking the rotary or differential mechanism in the steering mechanism for causing either the front or the rear road wheels to be locked, and at the same time causing either the front or the rear wheels to be placed under the control of the steering wheel or like device when the vehicle is travelling in either direction.

The invention will be more completely understood from the following detailed description, given in conjunction with the accompanying drawings, in which:

Figures 1 and 2 are side and plan views respectively of a four wheeled vehicle embodying a steering mechanism constructed in accordance with the invention, the vehicle itself being in skeleton form, only those parts having been shown which are essential for illustrating the method of connecting up the steering mechanism itself.

Figure 3 shows an enlarged longitudinal sectional view of one form of differential steering mechanism embodying the features of the invention.

Figure 4 shows a sectional plan view taken on line 4—4 of Figure 3.

Figure 5 shows a transverse section taken on line 5—5 of Figure 3, showing the mechanism in the position assumed when the front wheels are locked in straight alignment and the rear wheels adapted to be steered.

Figure 6:
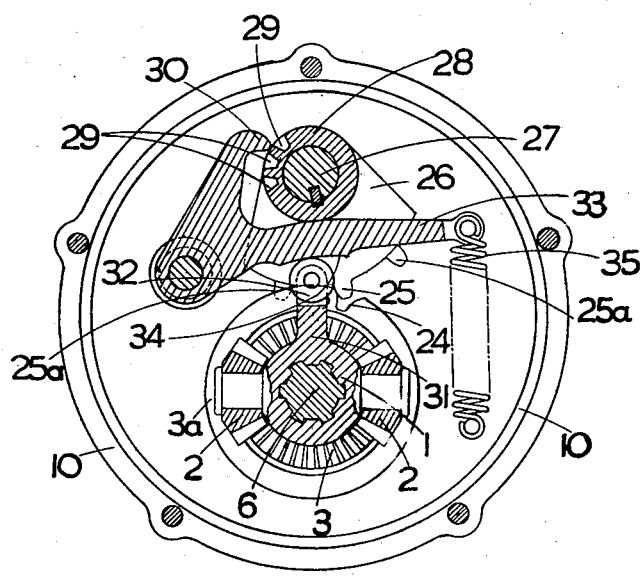
Figure 6 is a similar view to that of Figure 5, but showing the mechanism in the position assumed when the steering of the rear wheels has been turned to full lock, and the front wheels have been unlocked and are about to be made progressively steerable.
Figure 7:
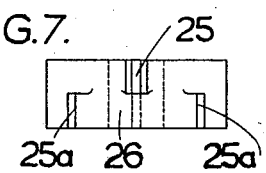
Figures 7, 7A and 7B are respectively a plan view and a side and a front elevation of one of the escapement pinions.
Figures 7A, 7B:
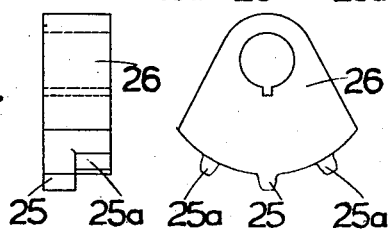
Figures 8, 8A:
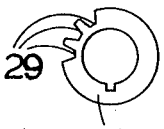
Figures 8 and 8A are respectively an end and a side elevation of the notched wheel adapted to be mounted on the slidable escapement shaft.

Figures 9 and 10 show respectively sectional views of the escapement wheel and pinion taken on lines 9—9 and 10—10 respectively of Figure 3.

Figures 11 and 12 show respectively sectional views of the escapement wheel and pinion taken on lines 11—11 and 12—12 respectively of Figure 3.

According to one practical embodiment of this invention the differential or rotary mechanism incorporated in the steering mechanism comprises a differential of the bevel gear type in which the differential pin or star piece 1 carrying the pinions 2 engaging with the differential gears 3 and 4 is connected to the steering column 5 through a shaft 6 on which is fixed a bevel pinion 7 engaging with a bevel pinion 8 mounted on the lower end of the said steering column 5 adapted to be driven by the steering wheel 9, the said gearing being conveniently mounted on suitable bearings within a built-up casing 10. The differential gear 3 meshing with one side of the central pinions 2 on the star piece 1 of the differential gearing is fixed to a shaft 11 connected to a conventional steering gear box 12 arranged to operate the steering of the front wheels 13 through the usual levers and drag links 14 and track rod 15, while the differential gear 4 meshing with the other side of the central pinions 2 on the star piece 1 of the differential gearing is mounted on a tubular shaft 16 on which is formed or fixed a bevel pinion 17 engaging with a bevel pinion 18 on a shaft 19 connected, as seen in Figure 2, by a shaft 20 through a crown pinion gear box 21 and shaft 22 and conventional steering gear box 12a arranged to operate the steering of the rear wheels 23 through the usual levers and drag links 14a and track rod 15a.

Means are provided as hereinafter described to effect the locking of the differential gear 3 coupled to the shaft 11 arranged to drive the front steering gear 12 while the differential gear 4 coupled to the shaft 16 arranged to drive the rear steering gear 12a is free to be driven by the pinions 2 of the differential mounted on the star piece 1 which is connected to and arranged to be turned or driven by the steering wheel 9, said means being also adapted to obversely effect the locking of the differential gear 4 coupled to the shaft 16 arranged to drive the rear steering gear 12a while the differential gear 3 coupled to the shaft 11 arranged to drive the front steering gear is free to operate in the manner as before described.

When the gear 3 of the differential which is coupled to the shaft 11 driving the front steering gear 12 is turned sufficient to turn the front road wheels 13 to full or maximum lock in either direction, the aforesaid locking means are adapted to automatically lock said differential gear 3 and at the same time unlock the differential gear 4 coupled to the shaft 19 driving the rear steering box 12a so that a continued turning movement of the steering wheel 9 in the same direction will steer the rear road wheels 23 onto full or maximum lock.

The aforesaid locking means are interconnected with the lever arranged to change the power transmission gears from forward to reverse drive so that when the reverse drive is engaged for driving the vehicle in the reverse direction, the said locking means are operated so as to reverse their action. When the action of the said locking means is reversed and the differential gear coupled to the shaft 19 driving the rear steering gear box 12a is turned by an amount sufficient to steer the rear road wheels onto full or maximum lock in either direction, said locking means lock said gear and at the same time unlock the gear coupled to the shaft 11 driving the front steering gear box 12, so that continued turning of the steering wheel 9 in the same direction steers the front road wheels 13 onto full lock.

In one convenient arrangement the aforesaid locking means, as seen in Figures 3 to 12, comprise escapement wheels 3a and 4a incorporated respectively with the differential gears 3 and 4 disposed on each side of the central pinions 2 and arranged to drive the front and rear steering gear boxes 12 and 12a, the said escapement wheels 3a and 4a each having formed in the periphery thereof one notch 24, 24a adapted to be engaged respectively by either one of two sets of teeth 25, 25a on escapement pinions 26, 26a mounted on a shaft 27 which is slidably and rockably carried in the casing 10 of the differential box, and on said shaft 27 is also keyed a wheel 28, as seen in Figures 5, 6, 8 and 8A, in which is formed a series of three notches 29 adapted to be engaged by a spring controlled pawl 30 which is pivotally mounted in the differential casing 10, whereby the aforesaid escapement shaft 27 after having imparted thereto a slight rocking or turning movement can be locked in either one of three positions to prevent rotation of same.

The aforesaid escapement pinions 26 and 26a, which are keyed to the slidable and rockable escapement shaft 27, and arranged to effect the locking and unlocking of the differential gear wheels 3 and 4, have each formed thereon a single tooth 25 and a pair of teeth 25a located on each side of said tooth 25 but out of alignment therewith, and so disposed that when the single tooth 25 on the escapement pinion 26 is in engagement with the notch 24 in the escapement wheel 3a of the differential gear wheel 3, to effect locking of same, as seen in Figure 3, the pair of teeth 25a on said escapement pinion 26 stand clear of said escapement wheel 3a, at the same time the single tooth 25 on the other escapement pinion 26a stands clear of the escapement wheel 4a of the differential gear 4, while the pair of teeth 25a on said escapement pinion lie above the periphery of the said escapement wheel 4a, but clear of engagement therewith, thus permitting turning movement of said differential gear wheel 4 to effect the turning or steering of the rear road wheels with which said differential gear wheel is operatively connected.

On the star piece 1 which carries the bevel pinions 2 of the differential is incorporated an arm 31 carrying a roller 32 arranged to engage with an arm 33 on the pawl 30 adapted for engagement with the notched wheel 28 on the escapement shaft 27, the said arm 33 having formed thereon a suitably shaped cam face 34 so arranged that when the star piece 1 of the differential, which is connected to and operated by the steering column 5, has been turned through one half of a complete revolution, as seen in Figure 6, which said movement operating through the differential gear wheel 4 is arranged to turn the rear road wheels to full lock, and in which operation the differential gear is turned through nearly a complete revolution so that the notch 24a in its escapement wheel 4a is brought to a position ready for engagement with one of the teeth 25a on the escapement pinion 26a, the said arm 33 will be moved so as to lift the pawl 30 from engagement with the notched wheel 28 on the escapement shaft 27, to unlock and permit of a part turning movement of said shaft 27.

A continued turning movement of the steering wheel 9 in the same direction will cause the differential gear wheel 3 to be unlocked and simultaneously effect the locking of the differential gear wheel 4 which is connected to and arranged to operate the steering of the rear road wheels 23, and will also effect the locking of the escapement shaft 27 which is caused to be slightly turned by the reaction of the differential gear wheel 3 which brings one of the outer notches 29 in the wheel 28 in the shaft 27 under the nose of the locking pawl 30 which is then free to move into engagement therewith by the spring 35, as the roller 32 on the arm 31 fixed to the star piece 1 of the differential gear will have moved clear of engagement with the cam face 34 on the arm 33 of the locking pawl 30. Further turning movement of the steering wheel 9 in the same direction will then impart a progressive steering movement to the front road wheels 13.

The aforesaid slidable escapment shaft 27 of the locking mechanism is arranged and adapted to be operated by the lever employed for changing the power transmission gears from forward to reverse drive. In one convenient arrangement, as seen in Figure 2, such is effected by a control lever 36 pivotally carried on a bracket 37 mounted on the longitudinal side member of the chassis frame, said lever 36 being connected to the transmission gear unit 38 by rocking levers and linkage 39 operating through a rocking shaft 40, transversely mounted between the side members of the chassis frame. The said rocking shaft 40 is also connected by suitable levers and linkage 41 and a bell-crank lever 42 to the slidable escapement shaft 27. The aforesaid linkage 41 is spring loaded to permit of the control lever 36 being moved to acutate the reverse gear when the steering is not in a straight ahead position, and such is effected by making the said linkage in two parts one of said parts being connected to a tubular member 43, and the other part connected to an intermediate block or abutment 44 slidably mounted in the aforesaid tubular member 43, and having located on opposite sides thereof reaction springs 45 and 46, the outer ends of said springs reacting on abutments mounted in the outer ends of the tubular member 43.

When the control lever 36 is operated to change the transmission gears to either forward or reverse, and if the steering is not in a straight ahead position, movement will take place in the spring loaded linkage 41 giving a pre-load to the steering differential escapement shaft 27. When the steering passes through the straight ahead position in which the teeth 25 on the escapement pinions 26 and 26a and the notches 24 and 24a on the escapement wheels 3a and 4a assume a position in alignment, this pre-load will impart sliding movement to the escapement shaft 27 and thus cause the steering to change over.

When the escapement shaft 27 is slid say to the left, that is from the position on the right as previously described and illustrated in Figure 3, the single tooth 25 on the escapement pinion 26a on the left will slide into engagement with the single notch 24a in the escapement wheel 4a of the differential gear wheel 4 connected to the rear steering box 12a thus preventing the turning of same, that is the rear steering will be locked, and simultaneously the single tooth 25 on the escapement pinion 26 on the right will slide out of engagement with the single notch 24 in the escapement wheel 3a of the differential gear wheel 3 connected to the front steering box 12, and the two teeth 25a on said escapement pinion 26 will assume a position over the periphery of the aforesaid escapement wheel, but clear of engagement therewith. The forward progressive steering of the vehicle can then be effected in the manner as previously described with reference to the rear steering.

The action of the locking means can thus be so conditioned by actuation of the control lever 36 so that by operation of the steering wheel 9 or like device the successive steering of the front and rear road wheels, or the rear and front road wheels, is selectively carried out according to the direction in which the vehicle is geared to travel.

Having thus described my invention, what I claim as new and desire to secure by Letters Patent is:

1. Steering mechanism for a motor vehicle having front and rear wheels for steering it, comprising steering gear boxes connected to the front and rear wheels respectively for steering them, differential mechanism embodying a pair of differential gears, means connecting said gears respectively to said gear boxes, a differential member carrying pinions meshing with said gears, a steering wheel connected to said differential member for operating it, devices cooperating with the respective differential gears and controlling their rotation, and means controlling said devices to permit rotation of said gears successively and thereby effect progressive steering of the front and then the rear wheels and to lock the front wheels and effect steering of the rear wheels.

2. Steering mechanism according to claim 1, wherein said controlling means is adjustable to prevent rotation of said gear which is connected to the front wheels to lock said wheels from steering movement and to permit rotation of the other of said gears to effect steering of the rear wheels.

3. Steering mechanism according to claim 1, including reverse driving control means for the vehicle, and wherein said controlling means has means for adjusting it by said reverse driving control means of the vehicle to lock one of said gears to lock the front wheels from steering movement and permit operation of the other of said gears to effect steering by the rear wheels.

4. Steering mechanism according to claim 1, wherein said differential member comprises a star piece carrying said pinions, and said differential gears engage opposite sides of said pinions, and said controlling means causes said devices to lock one of said differential gears and simultaneously unlock the other of said gears to permit successive steering of the front and rear wheels.

5. Steering mechanism according to claim 1, wherein said devices comprise notched escapement wheels on the respective differential gears, and said controlling means comprises escapement pinions having sets of teeth engageable with said escapement wheels, a slidable shaft on which said escapement pinions are mounted, said escapement pinions being movable by said slidable shaft to bring one of said pinions into locking relation with one differential gear while the other pinion is movable into a position to free the other differential gear for rotation to operate the road wheels to which it is connected, and means operative, when said road wheels have been steered to full lock, to lock the differential gear by which they were operated, while the other differential gear is freed to steer the other road wheels by a continued turning movement of the steering wheel.

6. Steering mechanism for a motor vehicle having front and rear wheels for steering it, comprising a steering wheel controlled operating member, differential gears connected respectively to the front and rear wheels for steering them and operable differentially by said operating member, means for locking one of the differential gears while the other is simultaneously unlocked to permit progressive steering of the front and rear road wheels, including a notched escapement wheel on each of said differential gears, escapement pinions each having two sets of teeth and engageable by one of their sets of teeth in the notches of the respective escapement wheels for controlling rotation of said differential gears, a rotatable shaft on which said escapement pinions are mounted and slidable to engage one or the other of said pinions with its respective escapement wheel, a notched wheel fixed on said shaft, a spring-controlled pivoted bell-crank lever engageable with said notched wheel for controlling rotation of said shaft, and an arm actuated by said operating member and controlling said lever.

7. Steering mechanism according to claim 6, including a reverse gear lever for the vehicle, and a spring-loaded linkage between said reverse gear lever and said slidable and rotatable shaft for pre-loading said linkage to effect sliding movement of said shaft and escapement pinions.

WILLIAM MARTIN BLAGDEN.